(12) United States Patent
Facchinello

(10) Patent No.: US 10,414,257 B2
(45) Date of Patent: Sep. 17, 2019

(54) CONNECTOR WITH SEAL

(71) Applicant: Tectum Holdings, Inc., Ann Arbor, MI (US)

(72) Inventor: Jerome Facchinello, Grand Blanc, MI (US)

(73) Assignee: Tectum Holdings, Inc., Ann Arbor, MI (US)

( * ) Notice: Subject to any disclaimer, the term of this patent is extended or adjusted under 35 U.S.C. 154(b) by 105 days.

(21) Appl. No.: 15/723,738

(22) Filed: Oct. 3, 2017

(65) Prior Publication Data

US 2019/0100088 A1 Apr. 4, 2019

(51) Int. Cl.
| | |
|---|---|
| *B60J 7/14* | (2006.01) |
| *B60J 10/00* | (2016.01) |
| *E05D 1/00* | (2006.01) |
| *B62D 33/04* | (2006.01) |
| *E05D 1/02* | (2006.01) |
| *E05D 5/02* | (2006.01) |

(52) U.S. Cl.
CPC ............. *B60J 7/141* (2013.01); *B60J 7/14* (2013.01); *B60J 10/00* (2013.01); *B62D 33/04* (2013.01); *E05D 1/00* (2013.01); *E05D 1/02* (2013.01); *E05D 5/0207* (2013.01); *E05Y 2900/516* (2013.01)

(58) Field of Classification Search
CPC ....... B60J 7/04; B60J 7/041; B60J 7/12; B60J 7/14; B60J 7/141; B62D 33/04; E05D 1/00
USPC .......................... 296/100.02, 100.06, 100.09
See application file for complete search history.

(56) References Cited

U.S. PATENT DOCUMENTS

| | | |
|---|---|---|
| 5,613,541 A | 3/1997 | Bradbury |
| 5,636,893 A | 6/1997 | Wheatley et al. |
| 5,782,282 A | 7/1998 | Chen |
| 6,719,363 B2 | 4/2004 | Erlandsson et al. |
| 7,047,576 B2 | 5/2006 | Tavivian |
| 7,334,830 B2 | 2/2008 | Weldy |
| 8,061,758 B2 | 11/2011 | Maimin et al. |
| 8,348,328 B2 | 1/2013 | Walser et al. |
| 8,672,388 B2 | 3/2014 | Rusher et al. |
| 8,881,464 B1 | 11/2014 | Huckeba |
| 9,004,571 B1 | 4/2015 | Bernardo et al. |
| 9,039,066 B1 | 5/2015 | Yue |

(Continued)

FOREIGN PATENT DOCUMENTS

WO 2003/006889 A2 1/2003

*Primary Examiner* — Jason S Daniels
(74) *Attorney, Agent, or Firm* — The Dobrusin Law Firm, P.C.

(57) ABSTRACT

A connector that includes a first U-shaped channel and a second U-shaped channel. The first U-shaped channel is defined by a first upper wall, a first lower wall, and a first end wall that connects the first upper wall and the first lower wall. The first U-shaped channel is adapted to receive a first enclosure panel. The second U-shaped channel is defined by a second upper wall, a second lower wall, and a second end wall that connects the second upper wall and the second lower wall. The second U-shaped channel is adapted to receive a second enclosure panel. The first U-shaped channel includes a first seal extending between the first upper wall and the first end wall. The first seal is compressed by the first enclosure panel when the first enclosure panel is received in the first U-shaped channel.

20 Claims, 4 Drawing Sheets

(56) References Cited

U.S. PATENT DOCUMENTS

| | | | |
|---|---|---|---|
| 9,074,372 | B2 | 7/2015 | Laurin et al. |
| 9,211,834 | B2 | 12/2015 | Facchinello et al. |
| 9,421,851 | B2 | 8/2016 | Kerr, III |
| 9,895,964 | B1 | 2/2018 | Hickey et al. |
| 2001/0035664 | A1 | 11/2001 | Steffens et al. |
| 2007/0210609 | A1 | 9/2007 | Maimin et al. |
| 2014/0312645 | A1 | 10/2014 | Maimin |
| 2016/0031305 | A1 | 2/2016 | Bernardo et al. |
| 2016/0176448 | A1* | 6/2016 | Germano ............... B60J 7/141 296/100.09 |
| 2016/0200375 | A1 | 7/2016 | Kerr, III |
| 2016/0200376 | A1 | 7/2016 | Kerr, III |
| 2016/0340949 | A1* | 11/2016 | Xu ......................... E05D 5/14 |
| 2017/0259655 | A1* | 9/2017 | Dylewski, II ........... B60J 7/141 |

* cited by examiner

CONNECTOR WITH SEAL

FIELD

These teachings relate to a connector, and more particularly to a connector for connecting together adjacent enclosure panels.

BACKGROUND

A tonneau cover is a cover that is adapted to cover a cargo box of a pickup truck.

Some tonneau covers have two or more enclosure panels. Adjacent enclosure panels may be connected together via a connector or rail. The connector or rail may be adapted to provide for the adjacent panels to be folded, pivoted, or otherwise moved to provide access to the inside of the cargo box.

Due to manufacturing and/or assembly variations, some edges of some enclosure panels may have uneven cuts or surfaces, which may provide an unintended passageway for water or particles to travel around an edge of an enclosure panel and enter the cargo box. Moreover, a size of the connector may vary due to manufacturing considerations and/or tolerances, which may likewise provide an unintended passageway for water to enter the cargo box. Also, during manufacturing and/or assembly of the tonneau, varying amounts of adhesives and/or sealants may be applied to the panels and/or connector, which may undesirably result in areas having little or no adhesive and/or sealant, which may also provide an unintended passageway for water to enter the cargo box.

During manufacturing and/or assembly of the tonneau cover, applying the adhesive and/or sealant may be labor intensive, time consuming, and cumbersome. Excess or even wasted adhesive and/or sealant may also be realized during manufacturing and/or assembly due to the manual application of the adhesive and/or sealant. Lastly, additional footprint in the manufacturing and/or assembly facility must be dedicated to storing the adhesive and/or sealant.

Accordingly, opportunities may exist for improving the current state of the art.

For example, in some applications, it may be desirable to have a tonneau cover that includes a connector with one or more seals. It may be desirable to have a connector with one or more seals that are adapted to contact and engage a corresponding enclosure panel to take up manufacturing and/or assembly variations in the enclosure panel(s) and/or connector so that passageways or gaps between the panel and the connector are reduced or eliminated to prevent water from traveling around the panel(s) and into the cargo box.

It may also be desirable to have a connector with one or more seals that engage the enclosure panels to prevent excess sealant from being applied to the panels and/or connector during assembly of the tonneau cover. It may also be desirable to have a connector with one or more seals to reduce or eliminate the amount of storage space required at the manufacturing and/or assembly facility for the adhesive and/or sealant.

SUMMARY

These teachings provide a tonneau cover that includes a connector with one or more seals. The connector according to these teachings includes one or more seals that are adapted to contact and engage a corresponding enclosure panel in order to take up manufacturing and/or assembly variations of an enclosure panel. The one or more seals that are adapted to contact and engage a corresponding enclosure panel in order to reduce or eliminate passageways or gaps between an enclosure panel and the connector to prevent water from traveling around the panel(s) and into the cargo box. The connector according to these teachings includes one or more seals that are adapted to engage the enclosure panels so that application of adhesive or sealant can be reduced or eliminated from the tonneau cover assembly process. This may advantageously reduce or eliminate space at the manufacturing and/or assembly facility required for storing adhesive and/or sealant.

These teachings provide a connector that includes a first U-shaped channel and a second U-shaped channel. The first U-shaped channel is defined by a first upper wall, a first lower wall, and a first end wall that connects the first upper wall and the first lower wall. The first U-shaped channel is adapted to receive a first enclosure panel. The second U-shaped channel is defined by a second upper wall, a second lower wall, and a second end wall that connects the second upper wall and the second lower wall. The second U-shaped channel is adapted to receive a second enclosure panel. The first U-shaped channel includes a first seal extending between the first upper wall and the first end wall. The first seal is compressed by the first enclosure panel when the first enclosure panel is received in the first U-shaped channel.

These teachings provide a tonneau cover for a pickup truck. The tonneau cover comprises a first enclosure panel; a second enclosure panel; and a connector. The connector comprises a first U-shaped channel and a second U-shaped channel. The first U-shaped channel is defined by a first upper wall, a first lower wall, and a first end wall that connects the first upper wall and the first lower wall. The first U-shaped channel is adapted to receive the first enclosure panel. The second U-shaped channel is defined by a second upper wall, a second lower wall, and a second end wall that connects the second upper wall and the second lower wall. The second U-shaped channel is adapted to receive the second enclosure panel. The first U-shaped channel comprises a first upper seal and a first lower seal. The first upper seal extends between the first upper wall and the first end wall, and the first lower seal extends between the first lower wall and the first end wall. The first upper seal and the first lower seal are compressed by an edge of the first enclosure panel when the first enclosure panel is received in the first U-shaped channel. The second U-shaped channel comprises a second upper seal and a second lower seal. The second upper seal extends between the second upper wall and the second end wall, and the second lower seal extends between the second lower wall and the second end wall. The second upper seal and the second lower seal are compressed by the second enclosure panel when the second enclosure panel is received in the second U-shaped channel.

These teachings provide an assembly comprising a first enclosure panel; a second enclosure panel; and a connector. The connector comprises: a first U-shaped channel and a second U-shaped channel. The first U-shaped channel is defined by a first upper wall, a first lower wall, and a first end wall that connects the first upper wall and the first lower wall. The first U-shaped channel is adapted to receive the first enclosure panel. The second U-shaped channel is defined by a second upper wall, a second lower wall, and a second end wall that connects the second upper wall and the second lower wall. The second U-shaped channel is adapted to receive the second enclosure panel. The first U-shaped channel comprises a first upper seal and a first lower seal.

The first upper seal extends between the first upper wall and the first end wall, and the first lower seal extends between the first lower wall and the first end wall. The first upper seal and the first lower seal are compressed by the first enclosure panel when the first enclosure panel is received in the first U-shaped channel. The second U-shaped channel comprises a second upper seal and a second lower seal. The second upper seal extends between the second upper wall and the second end wall, and the second lower seal extends between the second lower wall and the second end wall. The second upper seal and the second lower seal are compressed by the second enclosure panel when the second enclosure panel is received in the second U-shaped channel.

DETAILED DESCRIPTION

Figure 1:
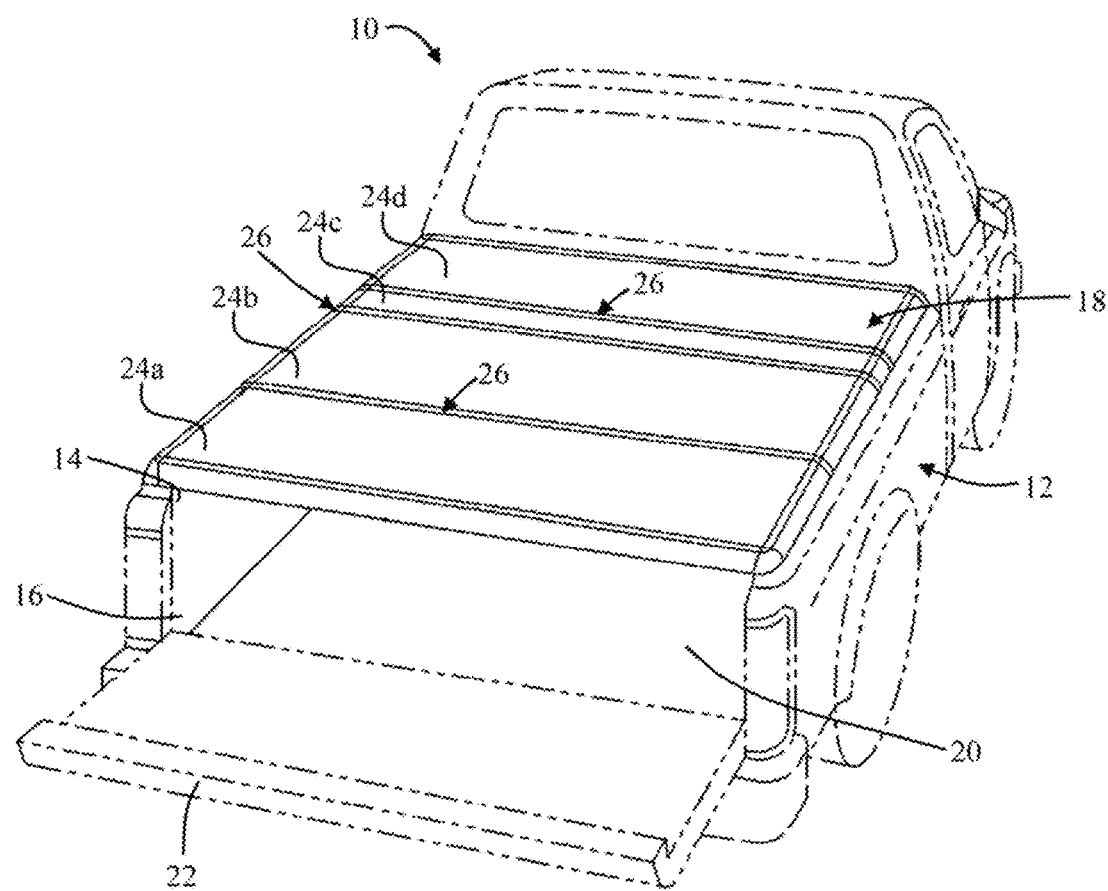
FIG. 1 is a perspective view of a pickup truck and an exemplary tonneau cover.

The tonneau cover may be a cover that is adapted to be placed over a cargo box of a vehicle, such as a pick-up truck or cargo truck. The tonneau cover may also be placed inside a vehicle, for example, to cover the trunk or cargo space of a vehicle like a station wagon or SUV. The tonneau cover may be adapted to protect and/or conceal the cargo bed or cargo space and/or any items located inside the cargo bed or cargo space from sight, water, particles, and/or contaminants.

The tonneau cover may comprise one or more connectors. The connector may be adapted to connect together adjacent enclosure panels. The connector may be adapted to provide for adjacent enclosure panels to move, bend, pivot, and/or be repositioned relative to each other. The connector may be adapted to restrict or prevent water, contaminants, particles, and the like from moving or traveling around edges of the enclosure panels and entering the cargo bed or cargo space of a vehicle.

The connector comprises one or more U-shaped channels. The U-shaped channel may be adapted to receive a portion of an enclosure panel. The U-shaped channel may be adapted to connect, engage, and/or attach the enclosure panel to the connector, and, therefore, to an adjacent enclosure panel that is connected or attached to the connector by the other U-shaped channel.

The U-shaped channel may be defined by one or more walls. The upper and lower walls defining the U-shaped channel may be generally parallel to one another, or the upper and lower walls may be slightly angled relative to one another to provide a lead-in so that an enclosure panel can be easily inserted into the U-shaped channel. Alternatively, the walls may be generally parallel to each other, but the inner surfaces of the walls may be drafted to provide a ramp or lead in into the U-shaped channel for the enclosure panel to be inserted into the U-shaped channel.

The one or more walls of the U-shaped channel may be fabricated from a rigid material such as polypropylene (PP), polyvinyl chloride (PVC), nylon, or a metal like aluminum. While the walls are preferably rigid to maintain structural rigidity of the connector and also the tonneau cover, the walls may be at least partially flexible or may be biased or moved away from one another so that an enclosure panel can be easily inserted into the channel. Moreover, somewhat flexible or bias able or reliant walls may be desirable to accommodate manufacturing tolerances in the enclosure panel thickness and/or the size and placement of the one or more seals inside the U-shaped channels.

The connector may comprise one or more upper and lower seals that extend between or are connected to two adjacent walls. These upper and lower seals may be located at two walls that are generally perpendicular to each other. These upper and lower seals may be located at two walls that are generally oppose each other (e.g., upper and lower walls that oppose each other). These upper and lower seals may be adapted to be engaged by an edge and/or surface of an enclosure panel to restrict or prevent water, particles, and/or other contaminants from finding a passageway around an edge or surface of the enclosure panel and into the cargo bed or cargo space of the vehicle.

One or more of these upper and lower seals may be bonded, sealed, or attached to the corresponding wall(s) U-shaped channel. For example, one or both of these seals may be co-extruded or injection molded in a 2-shot injection molding process with the corresponding wall(s) of the U-shaped channel. Alternatively, the connector can be formed via a suitable process (i.e., molded or extruded) and one or more of the upper and lower seals can be formed via a separate process (i.e., molded or extruded). One or more of the upper and lower seals may then be attached to the U-shaped channel by, for example, sliding the respective seal into a channel or groove defined in the corresponding walls and/or attaching the seal to the U-shaped channel with an adhesive. The material of the one or more upper and lower seals may be a soft, resilient, bias able, flexible material, such as a thermoplastic olefin (TPO), elastomeric, rubber, or other suitable flexible, bias-able, and/or resilient material.

The connector may comprise one or more upper and lower lip seals. The one or more upper and lower lip seals may be adapted to be engaged by a planar surface of an enclosure panel to restrict or prevent water, particles, and/or other contaminants from finding a passageway around an edge or surface of the enclosure panel and into the cargo bed or cargo space of the vehicle. One or more of these upper and lower lip seals may be bonded, sealed, or attached to the corresponding walls of the U-shaped channel. For example, one or more of these lip seals may be co-extruded or injection molded in a 2-shot injection molding process with the corresponding wall of the U-shaped channel. Alternatively, the connector can be formed via a suitable process (i.e., molded or extruded) and one or more of the upper and lower lip seals can be formed via a separate process (i.e., molded or extruded). One or more of the upper and lower lip seals may then be attached to the walls of the U-shaped channel by, for example, sliding the respective lip seal into a channel or groove defined in the corresponding wall and/or attaching the lip seal to the walls with an adhesive. The material of the one or more lip seals may be a soft, resilient, bias able, flexible material, such as a thermoplastic olefin (TPO), elastomeric, rubber, or other suitable flexible, biasable, and/or resilient material.

The connector may comprise one or more wall seals. The one or more wall seals may be adapted to be engaged by a planar surface of an enclosure panel to restrict or prevent water, particles, and/or other contaminants from finding a passageway around an edge or surface of the enclosure panel and into the cargo bed or cargo space of the vehicle. One or more of these wall seals may be bonded, sealed, or attached to the corresponding walls of the U-shaped channel. For example, one or more of these wall seals may be co-extruded or injection molded in a 2-shot injection molding process with the corresponding wall of the U-shaped channel. Alternatively, the connector can be formed via a suitable process (i.e., molded or extruded) and one or more of the wall seals can be formed via a separate process (i.e., molded or extruded). One or more of the wall seals may then be attached to the walls of the U-shaped channel by, for example, sliding the respective wall seal into a channel or groove defined in the corresponding wall and/or attaching the wall seal to the walls with an adhesive. The material of the one or more wall seals may be a soft, resilient, bias able, flexible material, such as a thermoplastic olefin (TPO), elastomeric, rubber, or other suitable flexible, bias-able, and/or resilient material.

While the connector is illustrated with various seals, sealants, and/or adhesives, it is understood that one or more of the various seals, sealants, and/or adhesives can be omitted. Moreover, one or more of the various seals, sealants, and/or adhesives can be manufactured or formed in the same manufacturing process as the rest of the connector, or may be added in a secondary step or operation. One or more of the various seals, sealants, and/or adhesives can be located in a notch or groove defined in the corresponding wall of the U-shaped channel. One or more of the various seals, sealants, and/or adhesives can be applied or attached directly to a surface of the corresponding wall of the U-shaped channel.

The connector may comprise one or more seals. The one or more seals may function to engage and form a seal with an enclosure panel. The one or more seals may function to restrict or prevent water, contaminants, particles, and the like from moving or traveling around surfaces and/or edges of the enclosure panels and entering the cargo bed or cargo space of a vehicle. The connector may comprise one or more seals may function to grip or engage an edge or surface of an enclosure panel to create a snug, friction fit between the enclosure panel and the connector to restrict or prevent separation of an enclosure panel and the connector.

The connector may comprise a center segment. The center segment may function to connect together the adjacent U-shaped channels. The center segment may function to provide for the U-shaped channels to bend, flex, pivot, articulate, or otherwise move relative to one another. The center segment may function to provide for the enclosure panels received into the corresponding U-shaped channels to bend, flex, pivot, articulate, or otherwise move relative to one another.

The center segment may be fabricated from a flexible, soft, resilient, bias able and/or compressible material. For example, the center segment may be fabricated from a material such as a thermoplastic olefin (TPO), elastomeric, rubber, or other suitable flexible, bias-able, and/or resilient material.

The center segment may be bonded, sealed, or attached to the corresponding walls of the U-shaped channel. For example, center segment may be co-extruded or injection molded in a 2-shot injection molding process with the corresponding wall of the U-shaped channel. Alternatively, the center segment can be formed via a suitable process (i.e., molded or extruded) and one or more of the U-shaped channels can be formed via a separate process (i.e., molded or extruded). The center segment may then be attached to the U-shaped channel by, for example, sliding the center segment into a channel or groove defined in the corresponding wall and/or attaching the center segment to the U-shaped channels with an adhesive.

FIG. 1 illustrates a vehicle 10. The vehicle 10 comprises a cargo box 12. The cargo box 12 comprises a top end 14 and a back end 16. A tonneau cover 18 is adapted to be placed over the top end 14 of the cargo box 12 to conceal an inside 20 of the cargo box 12 and/or to protect against dirt, debris, and other contaminants from entering the inside 20 of the cargo box 12. The vehicle 10 comprises a tailgate 22 that is adapted to cover the back end 16 of the cargo box 12.

The tonneau cover 18 comprises enclosure panels 24a, 24b, 24c, 24d. Adjacent enclosure panels 24a and 24b; 24b and 24c; 24c and 24d are connected together with a connector or rail 26.

Figure 2:
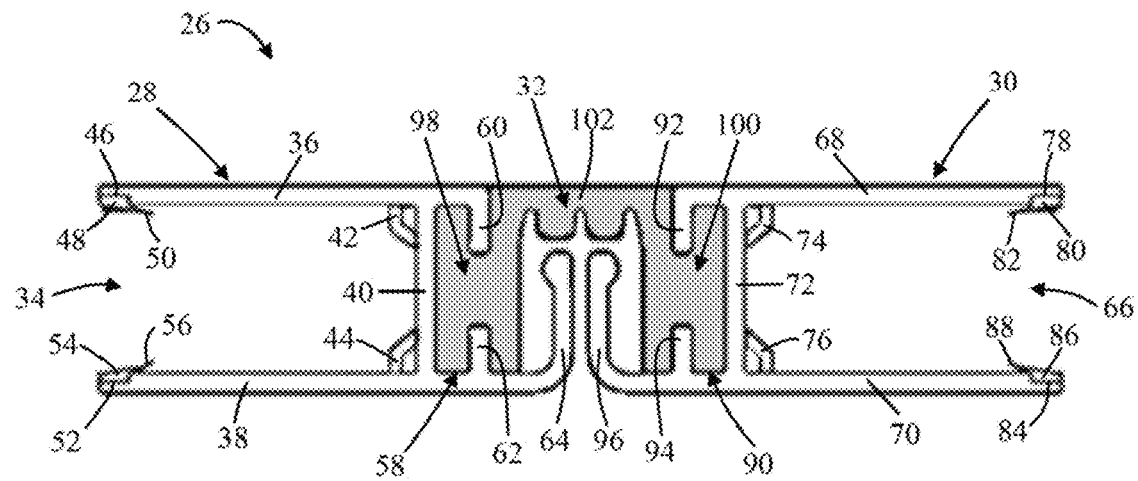
FIG. 2 is a cross-sectional view of a connector.

FIG. 2 illustrates the connector 26. The connector 26 comprises a first segment 28 and a second segment 30. A center segment 32 is disposed between the two segments 28, 30. The center segment 32 is adapted to attach or connect together the first segment 28 and the second segment 30.

The first segment 28 comprises a first U-shaped channel 34. The first U-shaped channel 34 is defined between a first upper wall 36, a first lower wall 38, and a first end wall 40 that connects the first upper wall 36 and the first lower wall 38.

The first U-shaped channel 34 comprises a first upper seal 42 extending between the first upper wall 36 and the first end wall 40. The first U-shaped channel 34 comprises a first lower seal 44 extending between the first lower wall 38 and the first end wall 40.

The first upper wall 36 comprises a first upper notch 46 into which a first upper lip seal 48 is attached. The first upper lip seal 48 comprises a lip portion 50 that angularly extends into the first U-shaped channel 34.

The first lower wall 38 comprises a first lower notch 52 into which a first lower lip seal 54 is attached. The lower lip seal 54 comprises a lip portion 56 that angularly extends into the first U-shaped channel 34.

The first segment 28 comprises a first C-shaped notched portion 58. The first C-shaped notched portion 58 is defined by the first end wall 40 of first U-shaped channel 34 and upper and lower ends 60, 62. The first segment 28 also comprises a first finger 64. The first finger 64 may function to help support the center segment 32 to keep the center segment 32 from dropping.

The second segment 30 comprises a second U-shaped channel 66. The second U-shaped channel 66 is defined between a second upper wall 68, a second lower wall 70, and a second end wall 72 that connects the second upper wall 68 and the second lower wall 70.

The second U-shaped channel 66 comprises a second upper seal 74 extending between the second upper wall 68 and the second end wall 72. The second U-shaped channel 66 comprises a second lower seal 76 extending between the second lower wall 70 and the second end wall 72.

The second upper wall 68 comprises a second upper notch 78 into which a second upper lip seal 80 is attached. The second upper lip seal 80 comprises a lip portion 82 that angularly extends into the second U-shaped channel 66. The second lower wall 70 comprises a second lower notch 84 into which a second lower lip seal 86 is attached. The second lower lip seal 86 comprises a lip portion 88 that angularly extends into the second U-shaped channel 66.

The second segment 30 comprises a second C-shaped notched portion 90. The second C-shaped notched portion 90 is defined by the second end wall 72 of second U-shaped channel 66 and upper and lower ends 92, 94. The second segment 30 also comprises a second finger 96. The second finger 96 may function to help support the center segment 32 to keep the center segment 32 from dropping.

The center segment 32 comprises a first H-shaped portion 98 that is supported in the first C-shaped notched portion 58. The center segment 32 comprises a second H-shaped portion 100 that is supported in the second C-shaped notched portion 90. The two H-portions 98, 100 are jointed together at a pivot or thinned-out region 102.

The center segment 32 may be made of a material that is different than the first segment 28 and second segment 30. For example, the center segment 32 may be made of a material that is flexible, resilient, moveable, and/or biasable, and the material of the first and second segments 28, 30 may be made of material that is rigid, not flexible and/or not bias able.

For example, the center segment 32 may be made of a thermoplastic olefin (TPO), elastomeric, rubber, or other suitable flexible, bias-able, and/or resilient material.

For example, one or both of the first and second segments 28, 30 may be made of a rigid material, such as polypropylene (PP), polyvinyl chloride (PVC), or nylon. One or both of the first and second segments 28, 30 may be made of a metal, such as aluminum.

The first segment 28, the second segment 30, and the center segment 32 may be formed by a suitable process, such as, for example: extrusion, injection molding, long fiber injection (LFI) or the like.

The first segment 28, the second segment 30, and the center segment 32 may be formed together as a single, integral component by a suitable process (i.e., extrusion, co-extrusion, injection molding, 2-shot injection molding, etc.)

Alternatively, one or more of the segments 28, 30, 32 may be formed, extruded, molded, etc. as individual components and then connected together with a mechanical fastener or adhesive.

Alternatively, one or more of the segments 28, 30, 32 may be formed, extruded, molded, etc. as individual components, and the H-shaped portions 98, 100 of the center segment 32 may be slid or snapped into the corresponding C-shaped notched portions 58, 90 of the corresponding segments 28, 30. The fit between the H-shaped portions 98, 100 and corresponding C-shaped notched portions 58, 90 may be an interference fit so that the segments 28, 30, 32 are locked and/or sufficient held together after assembly.

Figure 3:
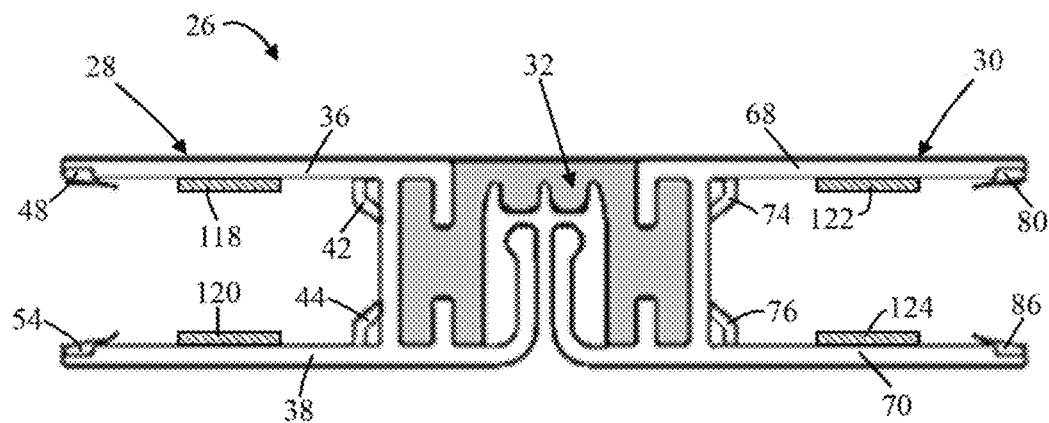
FIG. 3 is a cross-sectional view of a connector.

FIG. 3 illustrates a connector or rail 26. The connector or rail 26 illustrates in FIG. 3 may be substantially similar to the connector or rail 26 illustrated in FIG. 2. Therefore, similar or like features will not be described again in FIG. 3.

Figure 4:
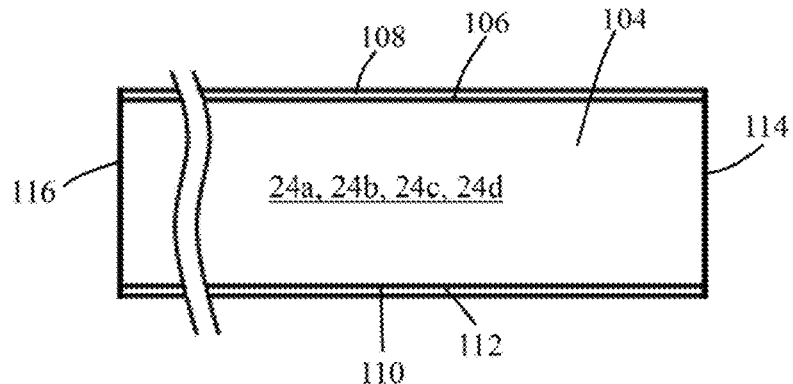
FIG. 4 is a cross-sectional view of a portion of an enclosure panel of the tonneau cover.

The connector or rail 26 may include a first upper wall seal 118 attached to the first upper wall 36. The first upper wall seal 118 may be adapted to contact or engage a top surface 106 of the core 104 or the skin 108 covering the core 104 (FIG. 4). The connector or rail 26 may include a first lower wall seal 120 attached to the first lower wall 38. The first lower wall seal 120 may be adapted to contact or engage a bottom surface 110 of the core 104 or the skin 112 covering the core 104 (FIG. 4).

The connector or rail 26 may include a second upper wall seal 122 attached to the second upper wall 68. The second upper wall seal 122 may be adapted to contact or engage a top surface 106 of the core 104 or the skin 108 covering the core 104 (FIG. 4). The connector or rail 26 may include a second lower wall seal 124 attached to the second lower wall 70. The second lower wall seal 124 may be adapted to contact or engage a bottom surface 110 of the core 104 or the skin 112 covering the core 104 (FIG. 4).

One or more of seals 118, 120, 122, and 124 may be received, attached, or connected to notches defined in the corresponding wall 36, 38, 68, 70 akin to the notches 46, 52, 78, 84 that the corresponding lip seals 46, 52, 80, 86 are received in. Alternatively, one or more of seals 118, 120, 122, and 124 may be attached to a surface of the corresponding wall 36, 38, 68, 70.

One or more of the aforementioned walls seals 118, 120, 122, 124 may be omitted. Moreover, one or more of the seals 42, 44, 74, 76 may be omitted. One or more of the seals 48, 54, 80, 86 may be omitted. Therefore, the connector 26 may comprise any combination of seals 42, 44, 74, 76, 48, 54, 80, 86, 118, 120, 122, and 124.

FIG. 4 illustrates an exemplary one of the enclosure panels 24a, 24b, 24c, 24d. The enclosure panel 24a, 24b, 24c, 24d comprises a center core 104. A top surface 106 of the core 104 may be covered with a top skin material 108. A bottom surface 110 of the core 104 may be covered with a bottom skin material 112. Each enclosure panel includes opposing edges 114, 116.

Figure 5:
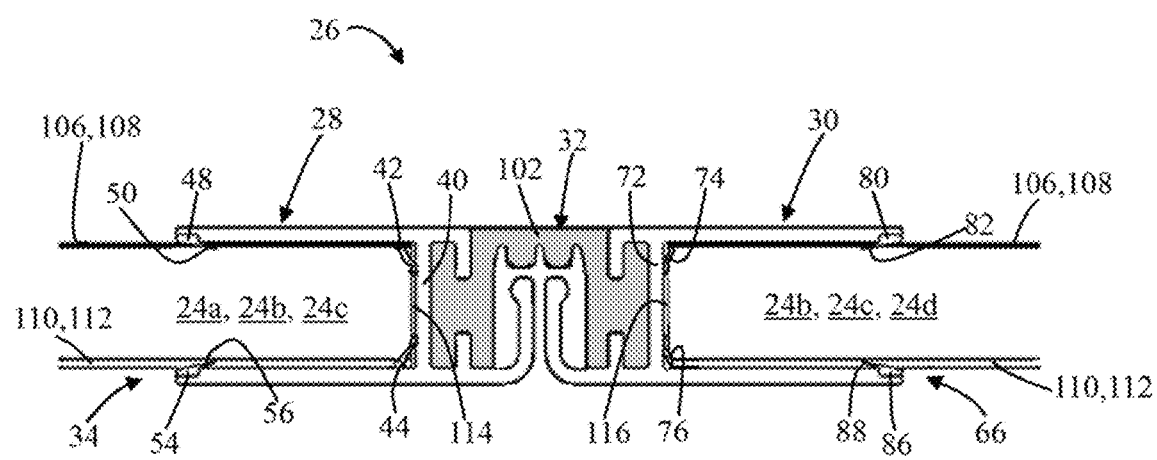
FIG. 5 is a cross-sectional view of a connector connecting together two adjacent enclosure panels of a tonneau cover.

FIG. 5 illustrates the connector 26 connecting together adjacent enclosure panels 24. A first enclosure panel 24a, 24b, or 24c is adapted to be received in the first U-shaped channel 34 such one or both of the first upper and lower seal 42, 44 are compressed by the edge 114 of the first enclosure panel 24a, 24b, or 24c. Compression of one or both of the seals 42, 44 by the edge 114 of the first enclosure panel 24a, 24b, or 24c functions to form a seal at the joint or point of contact between the connector 26 and the corresponding enclosure panel 24a, 24b, or 24c so that, for example, water or other debris will be prevented from flowing around the edge 114 of the panel 24a, 24b, or 24c and into the inside 20 of cargo box 12 of the vehicle 10.

The first enclosure panel 24a, 24b, or 24c may be received in the first U-shaped channel 34 such that the edge 114 contacts the first end wall 40. Alternatively, the first enclosure panel 24a, 24b, or 24c may be received in the first U-shaped channel 34 such that a gap is defined between the edge 114 and the first end wall 40.

After the first enclosure panel 24a, 24b, or 24c is received in the first U-shaped channel 34, the first upper lip seal 48 and/or the first lip portion 50 are adapted to contact and seal against a top surface 106 of the core 104 or the skin 108 covering the top surface 106 of the core 104 of the first enclosure panel 24a, 24b, or 24c. The first lower lip seal 54 and/or the lip portion 56 are adapted to contact and seal against a bottom surface 110 of the core 104 or the skin 112 covering the bottom surface 110 of the core 104 of the first enclosure panel 24a, 24b, or 24c.

While not illustrated in FIG. 5, if the connector 26 comprises one or more of the wall seals 118, 120 illustrated in FIG. 3, then one or both of the wall seals 118, 120 may contact and/or may be compressed by the first enclosure panel 24a, 24b, or 24c and form additional seals at the joint between the connector 26 and the corresponding enclosure panel 24a, 24b, or 24c so that, for example, water or other debris will be prevented from flowing around the surfaces 106, 108 and/or 110, 112 of the panel 24a, 24b, or 24c and into the inside 20 of cargo box 12 of the vehicle 10.

One or both of the seals 48, 54 may contact and/or may be compressed by the first enclosure panel 24a, 24b, or 24c and form additional seals at the joint between the connector 26 and the corresponding enclosure panel 24a, 24b, or 24c so that, for example, water or other debris will be prevented from flowing around an edge 114 of the panel 24a, 24b, or 24c and into the inside 20 of cargo box 12 of the vehicle 10.

A second enclosure panel 24b, 24c, or 24d is adapted to be received in the second U-shaped channel 66 such the second upper seal 74 and the second lower seal 76 are compressed by the edge 116 of the second enclosure panel 24b, 24c, or 24d. Compression of the seals 74, 76 by the edge 116 of the second enclosure panel 24b, 24c, or 24d functions to form a seal at the joint or point of contact between the connector 26 and the corresponding enclosure panel 24b, 24c, or 24d so that, for example, water or other debris will be prevented from flowing around the edge 116 of the panel 24b, 24c, or 24d and into the inside 20 of cargo box 12 of the vehicle 10.

The second enclosure panel 24b, 24c, or 24d may be received in the second U-shaped channel 66 such that the edge 116 contacts the second end wall 72. Alternatively, the second enclosure panel 24b, 24c, or 24d may be received in the second U-shaped channel 66 such that a gap is defined between the edge 116 and the second end wall 72.

After the second enclosure panel 24b, 24c, or 24d is received in the second U-shaped channel 66, the second upper lip seal 80 and/or the second lip portion 82 are adapted to contact and seal against the top surface 106 of the core 104 or the skin 108 covering the top surface 106 of the core 104 of the second enclosure panel 24b, 24c, or 24d. The first lower lip seal 86 and/or the lip portion 88 are adapted to contact and seal against a bottom surface 110 of the core 104 or the skin 112 covering the bottom surface 110 of the core 104 of the second enclosure panel 24b, 24c, or 24d.

Again, while not illustrated in FIG. 5, if the connector 26 comprises one or more of the wall seals 122, 124 illustrated in FIG. 3, then one or both of the wall seals 122, 124 may contact and/or may be compressed by the first enclosure panel 24a, 24b, or 24c and form additional seals at the joint between the connector 26 and the corresponding enclosure panel 24a, 24b, or 24c so that, for example, water or other debris will be prevented from flowing around the surfaces 106, 108 and/or 110, 112 of the panel 24a, 24b, or 24c and into the inside 20 of cargo box 12 of the vehicle 10.

One or both of the lip seals 80, 86 may contact and/or may be compressed by the second enclosure panel 24b, 24c, or 24d and form additional seals at the joint between the connector 26 and the corresponding enclosure panel 24b, 24c, or 24d so that, for example, water or other debris will be prevented from flowing around an edge 116 of the panel 24b, 24c, or 24d and into the inside 20 of cargo box 12 of the vehicle 10.

With continued reference to FIG. 5, the pivot or thinned out region 102 is adapted to provide for the first segment 28 to move relative to the second segment 30; for the second segment 30 to move relative to the first segment 28; or both segments 28, 30 to move relative to each other. In other words, the pivot or thinned out region 102 may be a living hinge. However, in addition or instead, the pivot or thinned out region 102 may include a mechanical hinge or mechanism that provides for the segments 28, 30 to move relative to each other. Stated another way, with the first enclosure panel 24a, 24b, or 24c received into the first U-shaped channel 34 and the second enclosure panel 24b, 24c, or 24d received into the second U-shaped channel 66, the first enclosure panel 24a, 24b, or 24c can be moved or pivoted about the pivot or thinned-out region 102 to place the first enclosure panel 24a, 24b, or 24c and the first segment 28 into an angular relationship relative to the second enclosure panel 24b, 24c, or 24d and second segment 30. The angular relationship may be 90 degrees (see FIG. 5, for example); 180 degrees (see FIG. 6, for example), or into an angular position between 0 degrees (FIG. 4) and 180 degrees (FIG. 6).

Figure 6:
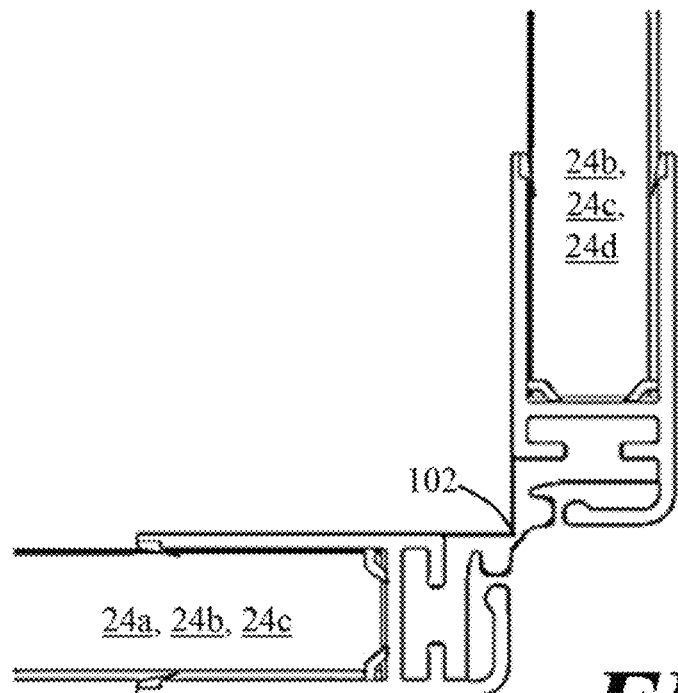
FIG. 6 is a cross-sectional view of the connector connecting together two adjacent enclosure panels of a tonneau cover, the enclosure panels are in an angled orientation relative to each other.

FIG. 6 illustrates the connector 26 where the angular relationship between the first enclosure panel 24a, 24b, or 24c and the second enclosure panel 24b, 24c, or 24d is approximately 90 degrees.

Figure 7:
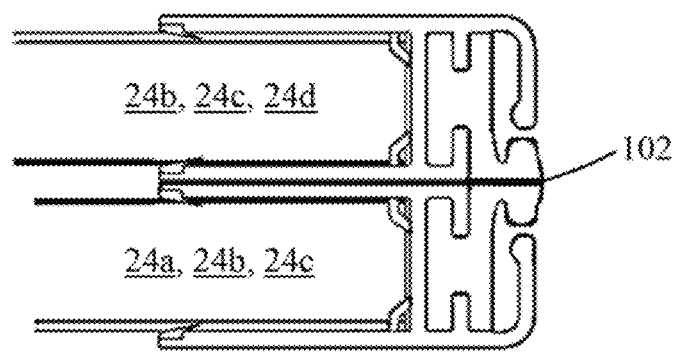
FIG. 7 is a cross-sectional view of the connector connecting together two adjacent enclosure panels of a tonneau cover, the enclosure panels are angled orientation relative to each other.

FIG. 7 illustrates the connector 26 where the angular relationship between the first enclosure panel 24a, 24b, or 24c and the second enclosure panel 24b, 24c, or 24d is approximately 180 degrees.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

By use of the term "may" herein, it is intended that any described attributes that "may" be included are optional.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

LISTING OF REFERENCE NUMERALS 10 vehicle
12 cargo box
14 top end
16 back end
18 tonneau cover
20 inside of cargo box 12
22 tailgate
24 enclosure panels
26 connector or rail
28 first segment of connector 26
30 second segment of connector 26
32 center segment of connector 26
34 first U-shaped channel
36 first upper wall of first U-shaped channel 34
38 first lower wall of first U-shaped channel 34
40 first end wall of first U-shaped channel 34
42 first upper seal of first U-shaped channel 34
44 first lower seal of first U-shaped channel 34
46 first upper notch in first upper wall 36
48 first upper lip seal
50 lip portion of first upper lip seal 48
52 first lower notch in first lower wall 38
54 first lower lip seal
56 lip portion of first lower lip seal 54
58 first C-shaped notched portion
60 upper end of first C-shaped notched portion 58
62 lower end of first C-shaped notched portion 58
64 first finger of first segment 28
66 second U-shaped channel
68 second upper wall of second U-shaped channel 66
70 second lower wall of second U-shaped channel 66
72 second end wall of second U-shaped channel 66
74 second upper seal of second U-shaped channel 66
76 second lower seal of second U-shaped channel 66
78 second upper notch in second upper wall 68
80 second upper lip seal
82 lip portion of second upper lip seal 80
84 second lower notch of second lower wall 70
86 second lower lip seal
88 lip portion of the second lower lip seal 86
90 second C-shaped notched portion
92 upper end of second C-shaped notched portion 90
94 lower end of second C-shaped notched portion 90
96 second finger of second segment 30
98 first H-shaped portion
100 second H-shaped portion
102 pivot or thinned-out region
104 core of enclosure panel 24
106 top surface of core 104
108 skin covering top surface 106
110 bottom surface of core 104
112 skin covering bottom surface 110
114 Edge of panel 24
116 edge of panel
118 first upper wall seal
120 first lower wall seal
122 second upper wall seal
124 second lower wall seal

The invention claimed is:

1. A connector connecting together adjacent enclosure panels of a tonneau cover, the connector comprising:
   a first U-shaped channel defined by a first upper wall, a first lower wall, and a first end wall, the first U-shaped channel is adapted to receive a first enclosure panel of the tonneau cover;
   a second U-shaped channel defined by a second upper wall, a second lower wall, and a second end wall, the second U-shaped channel is adapted to receive a second enclosure panel of the tonneau cover;
   wherein the first U-shaped channel comprises a first upper seal extending at an angle between the first upper wall and the first end walls such that a corner defined at an intersection of the first upper wall and the first end wall is free of contact by the first upper seal.

2. The connector according to claim 1, wherein the first U-shaped channel comprises a first lower seal extending at an angle between the first lower wall and the first end wall such that a corner defined at an intersection of the first lower wall and the first end wall is free of contact by the first lower seal.

3. The connector according to claim 1, wherein the second U-shaped channel comprises a second upper seal extending at an angle between the second upper wall and the second end wall such that a corner defined at an intersection of the second upper wall and the second end wall is free of contact by the second upper seal.

4. The connector according to claim 3, wherein the second U-shaped channel comprises a second lower seal extending at an angle between the second lower wall and the second end wall such that a corner defined at an intersection of the second lower wall and the second end wall is free of contact by the second lower seal.

5. The connector according to claim 4, wherein the first U-shaped channel comprises a first lower seal extending at an angle between the first lower wall and the first end wall such that a corner defined at an intersection of the first lower wall and the first end wall is free of contact by the first lower seal.

6. The connector according to claim 5, wherein the connector comprises a center segment that comprises a pivot; and
   wherein the first U-shaped channel, the second U-shaped channel, or both is/are adapted to pivot relative to each other about the pivot.

7. The connector according to claim 6, wherein the center segment comprises two H-shaped sections that are joined together at the pivot.

8. A connector connecting together adjacent enclosure panels of a tonneau cover, the connector comprising:
   i) a first U-shaped channel defined by a first upper wall, a first lower wall, and a first end wall, the first U-shaped channel is adapted to receive a first enclosure panel of the tonneau cover;
   ii) a second U-shaped channel defined by a second upper wall, a second lower wall, and a second end wall, the second U-shaped channel is adapted to receive a second enclosure panel of the tonneau cover;
   wherein the first upper wall comprises a first upper lip seal that extends angularly into the first U-shaped channel, the first upper lip seal is compressed by the first enclosure panel after the first enclosure panel is at least partially received in the first U-shaped channel.

9. The connector according to claim 8, wherein the first upper wall comprises a first upper notch, and the first upper lip seal is located in the first upper notch.

10. The connector according to claim 8, wherein the connector comprises a center segment comprising a pivot, the center segment is located between the first U-shaped channel and the second U-shaped channel and is adapted to connect the first U-shaped channel and the second U-shaped channel; and
wherein the first enclosure panel, the second enclosure panel, or both is/are adapted to pivot relative to each other the pivot.

11. The connector according to claim 10, wherein the pivot comprises two generally H-shaped regions.

12. The connector to claim 8,
wherein the second upper wall comprises a second upper lip seal that extends angularly into the second U-shaped channel, the second upper lip seal is compressed by the second enclosure panel after the second enclosure panel is at least partially received in the second U-shaped channel.

13. The connector according to claim 8, wherein the first lower wall comprises a first lower lip seal that that extends angularly into the first U-shaped channel, the first lower lip seal is compressed by the first enclosure panel after the first enclosure panel is at least partially received in the first U-shaped channel.

14. The connector according to claim 13, wherein the first lower wall comprises a first lower notch and the first lower lip seal is located in the first lower notch.

15. The connector according to claim 13, wherein the second upper wall comprises a second upper lip seal and the second lower wall comprises a second lower lip seal, both of the second upper lip seal and the second lower lip seal extend angularly into the second U-shaped channel, both of the second upper lip seal and the second lower lip seal are compressed by the second enclosure panel after the second enclosure panel is at least partially received in the second U-shaped channel.

16. A connector connecting together adjacent enclosure panels of a tonneau cover, the connector comprising:
i) a first U-shaped channel, the first U-shaped channel defined by a first upper wall, a first lower wall, and a first end wall, the first U-shaped channel is adapted to receive a first enclosure panel of the tonneau cover;
ii) a second U-shaped channel, the second U-shaped channel defined by a second upper wall, a second lower wall, and a second end wall, the second U-shaped channel is adapted to receive a second enclosure panel of the tonneau cover;
wherein the first U-shaped channel comprises a first upper seal that extends at an angle between the first upper wall and the first end wall such that a corner defined at an interaction of the first upper wall and the first end wall is free of contact by the first upper seal; and
wherein the first upper wall comprises a first upper lip seal that extends angularly into the first U-shaped channel, the first upper lip seal is compressed by the first enclosure panel after the first enclosure panel is at least partially received in the first U-shaped channel.

17. The connector according to claim 16,
wherein the second U-shaped channel comprises a second upper seal that extends at an angle between the second upper wall and the second end wall such that a corner defined at an intersection of the second upper wall and the second end wall is free of contact by the second upper seal; and
wherein the second upper wall comprises a second upper lip seal that extends angularly into the second U-shaped channel, the second upper lip seal is compressed by the second enclosure panel after the second enclosure panel is at least partially received in the second U-shaped channel.

18. The connector according to claim 17, wherein the first upper wall comprises a first upper notch, and the first upper lip seal is located in the first upper notch; and
wherein the second upper wall comprises a second upper notch, and the second upper lip seal is located in the second upper notch.

19. The connector according to claim 17, wherein the first U-shaped channel comprises a first lower seal that extends at an angle between the first lower wall and the first end wall such that a corner defined at an intersection of the first lower wall and the first end wall is free of contact by the first upper seal;
wherein the first lower wall comprises a first lower lip seal that extends angularly into the first U-shaped channel, the first lower lip seal is compressed by the first enclosure panel after the first enclosure panel is at least partially received in the first U-shaped channel;
wherein the second U-shaped channel comprises a second lower seal that extends at an angle between the second lower wall and the second end wall such that a corner defined at an intersection of the second lower wall and the second end wall is free of contact by the second lower seal; and
wherein the second lower wall comprises a second lower lip seal that extends angularly into the second U-shaped channel, the second lower lip seal is compressed by the second enclosure panel after the second enclosure panel is at least partially received in the second U-shaped channel.

20. The connector according to claim 16, wherein the first U-shaped channel comprises a first lower seal that extends at an angle between the first lower wall and the first end wall such that a corner defined at an intersection of the first lower wall and the first end wall is free of contact by the first lower seal; and
wherein the first lower wall comprises a first lower lip seal that extends angularly into the first U-shaped channel, the first lower lip seal is compressed by the first enclosure panel after the first enclosure panel is at least partially received in the first U-shaped channel.

* * * * *